Feb. 24, 1925.

M. A. MARQUETTE 1,527,206

MANUFACTURE OF PLASTIC ARTICLES

Filed Jan. 8, 1921

INVENTOR
Melvon A. Marquette.
BY
*Edward C. Taylor*
ATTORNEY

Patented Feb. 24, 1925.

1,527,206

UNITED STATES PATENT OFFICE.

MELVON A. MARQUETTE, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

MANUFACTURE OF PLASTIC ARTICLES.

Application filed January 8, 1921. Serial No. 435,823.

*To all whom it may concern:*

Be it known that I, MELVON A. MARQUETTE, a citizen of the United States of America, residing at Chicopee Falls, in the county of Hampden and State of Massachusetts, have invented certain new and useful Improvements in Manufacture of Plastic Articles, of which the following is a specification.

This invention relates to the manufacture of plastic articles and in particular to the manufacture of the outer casings for automobile tires. It has for its object, to improve the manufacture of such articles, particularly in the aspects noted below, and also to improve the construction of molds for making such articles. My invention will now be described in connection with the accompanying drawings in which.

Figure 1:
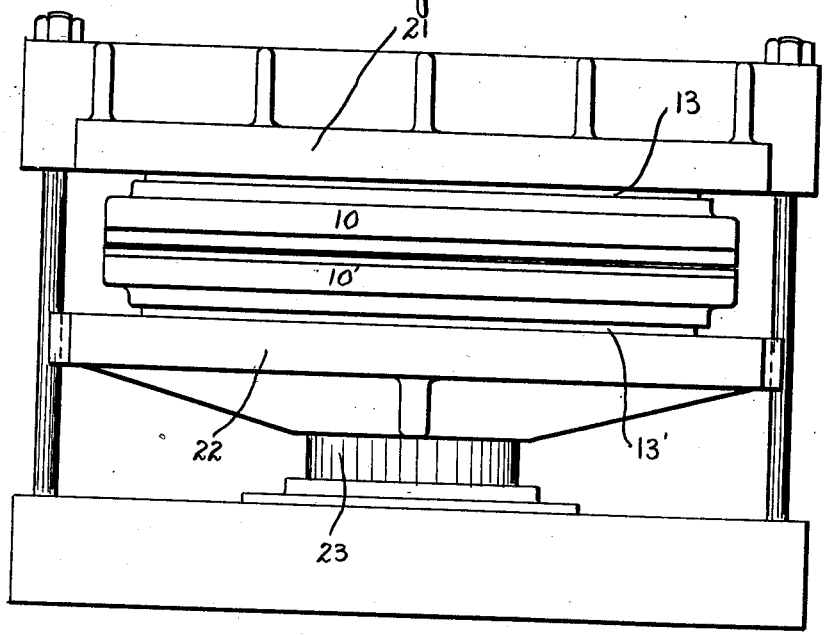
Fig. 1 is an elevation of a press with my improved mold being acted on thereby.
Figure 2:
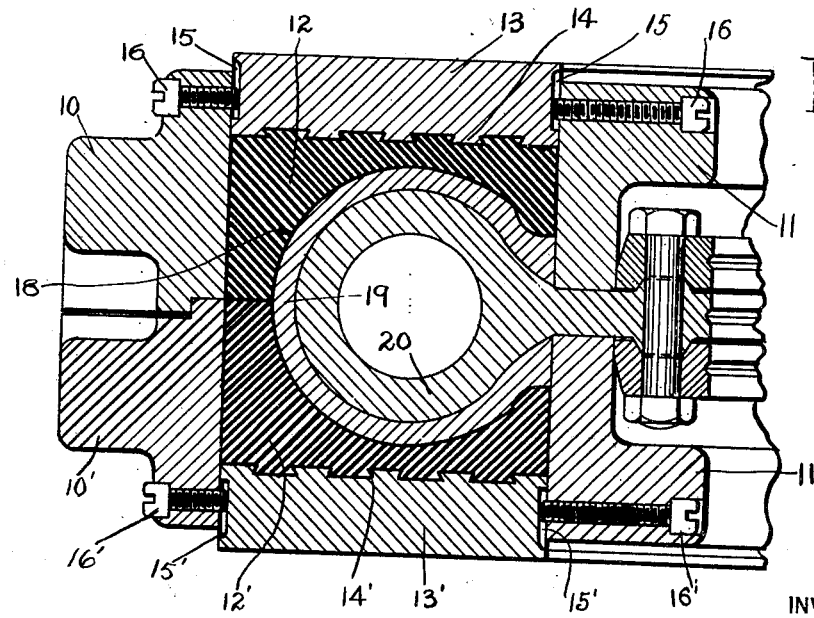
Fig. 2 is a partial transverse section of the mold showing a tire carcass mounted therein.

My present invention is applicable to plastic articles generally, but has particular utility in the treatment of rubber tires. For convenience, therefore, the invention will hereafter be described in its relation to the manufacture of automobile tire casings.

In building the outer casings for automobile tires it is desirable to vulcanize the casing between rigid members such as an internal core and an external mold. Broadly, this is a well known method but difficulty has been experienced with it in that the fabric component of the tire casing, particularly in the case of so-called cord tires, is distorted or buckled during the vulcanization process by the flowing of the tread portion of the rubber in conforming to the shape of the mold. In its aspect relating to the manufacture of tire casings my invention contemplates pressing the carcass of the casing by means of a yielding surface before the tread portion is assembled therewith. This is preferably done while the material is substantially at atmospheric temperature, but may be done in the presence of heat if desired. After this preliminary pressure the tread is added and the tire vulcanized in the usual manner. The preliminary pressure serves to compact the carcass and will prevent any substantial shifting of the fabric portion during the subsequent vulcanization. The desirability of compacting or solidifying the carcass prior to vulcanization is due in part to the imperfect manner in which the rubber lies between the cords at the time that these cords are laid in the tire casing, and also in part to the deleterious effect of air entrapped between successive plies of material as these are built into the casing and in the body of the fibrous material itself. By pressing the carcass the deleterious effect of this entrapped air is reduced and the rubber is forced fully between adjacent cords so that when the tire is finally vulcanized under rigid molding pressure no substantial further compression will occur. It is desirable to accomplish this compacting before the tread is applied, as if the latter is molded before the carcass is solidified the flow of material will tend to cause shifting of the cords and consequent buckles.

In order to accomplish these results I preferably use a mold constructed as follows: The mold is formed of two opposed annular sections, each section comprising an outer ring 10 and an inner ring 11, these and other elements of the lower mold section being designated by primed numerals. In the annular space between these rings is a yielding member 12, preferably formed of vulcanized rubber. Also in this annular space is a pressure-transmitting member 13 which may be connected as by dovetails 14 with the yielding member. In order to retain this pressure-transmitting member in the proper relation to the mold sections the member 13 may be provided with slots 15 into which fit screws or dowels 16 secured to members 10 and 11. The internal cavity 18 of the yielding member 13 is formed to the general contour of a tire carcass 19, preferably mounted on a core 20 which may be of the usual construction. In order to hold members 10 and 11 in their proper position when the mold sections are separated, it may be found desirable to provide bridge members extending between these rings through heads in members 13, but I have not illustrated this as in most cases it will not be necessary.

In practicing my improved method with a mold so constructed the tire carcass 19, mounted on a rigid core 20, is placed between the sections of my improved mold.

This mold is placed between the heads 21 and 22 of a press which may be operated by a hydraulic plunger 23. Pressure now being applied, the pressure transmitting members 13, which it will be noticed project slightly beyond the rings 10 and 11, will transmit the pressure through the yielding members 12 to the tire carcass. Rings 10 and 11 serve to confine the yielding member so that the only movement possible is in such a direction as to compress the carcass. As this pressure is applied to the carcass substantially normally to its surface there will be no tendency to distort the carcass and the effect will be a pure compacting.

It may be found desirable from the standpoint of operation to connect members 13 directly to the heads of the press but this is not essential and the mold is preferably constructed separate from the press itself.

Having thus described by invention, I claim:

1. A tire mold comprising opposed annular sections, a yielding mass of pressure-transmitting material therein presenting a formed molding cavity, and movable members constructed and arranged to transmit pressure from an outside source to said yielding surfaces.

2. A tire mold comprising opposed annular sections, an annular ring of yielding material movably mounted in each section, said rings together presenting a molding cavity, and pressure-transmitting members connected to said yielding rings and movably mounted in said sections.

3. A mold comprising a yielding distortable member, and rigid confining means preventing distortion of said member except in the direction of the article to be molded, said confining means having a movable portion whereby the distortable member may be placed under pressure.

4. The method of making tire casings comprising assembling the carcass portion thereof of uncured rubber and fibrous material, subjecting said uncured carcass to a yielding pressure substantially simultaneously over the entire external surface thereof while supporting its inner surface, applying the tread and other covering portions of the casing, and vulcanizing the complete casing under rigid compacting pressure.

5. The method of making tire casings comprising assembling the carcass portion thereof of uncured rubber and fibrous material, subjecting said uncured assembled carcass to yielding pressure prior to vulcanization to compact it to an extent sufficient to prevent injurious shifting of the material in a later molding operation, completing the assembling of the casing by applying to the pressed carcass such covering material as is desired, and subsequently vulcanizing the assembled casing under rigid compacting pressure.

MELVON A. MARQUETTE.